3,262,496
HEAT EXCHANGER CONSTRUCTION

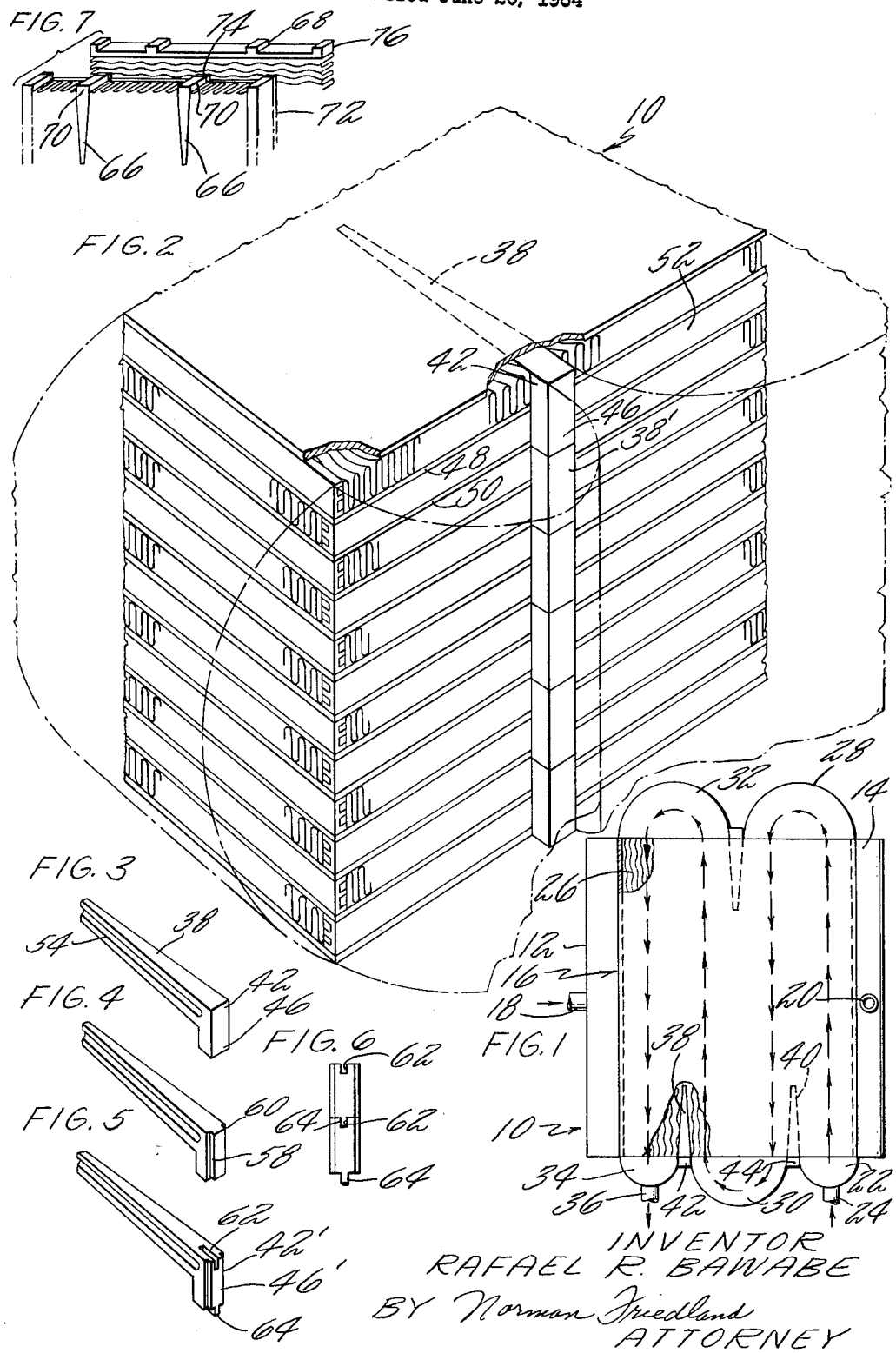

Rafael R. Bawabe, Manchester, Conn., assignor to United Aircraft Corporation, East Hartford, Conn., a corporation of Delaware
Filed June 26, 1964, Ser. No. 378,218
8 Claims. (Cl. 165—166)

This invention relates to heat exchanger constructions and particularly to pass separators in the core of heat exchangers.

In the multi-pass plate-fin heat exchanger it is generally well known in the art that provisions must be made for confining the flow in the required passage and directing the flow from one pass to the next. In the heretofore known plate-fin type heat exchangers it has been the customary practice to insert a solid extending member between the sections of the fins for each pass. Turn headers or core bands are then directly welded to these members and the adjacent closure channels or tubes on the face or side of the core. This arrangement has the disadvantage of requiring welding right on the core surface and the likelihood of burning fins and opening leaks between parting sheets and closure channels adjacent to the point of welding. In addition, welding accessibility is impaired in certain applications, particularly between headers, and as a result making it difficult to produce uniform, strong and sound weld joints.

I have found that I can obviate these disadvantages by providing a pass separator formed to carry an abutment that projects beyond the face of the core and extend across the adjacent layer of the core so that when layers of the core are stacked these projections form a continuous ridge extending from the top to the bottom of the core. Alternatively, but not intended to be limited thereto, the adjacent closure bar may carry a projection attached thereto or made integral therewith in line with and of the same depth and width as the projection of the pass separator. In either of these concepts the pass separator is assembled as an integral part of the core and is directly brazed to the parting sheets, the adjacent closure member and to the pass separator in the adjacent layer of the core. In this manner the pass separators form a continuous solid area adapted to receive and support a header or the like by welding or other suitable means.

It is therefore an object of this invention to provide pass separators for cores of the multi-pass plate-fin type of heat exchangers having a projection extending beyond the face of the core for supporting headers and the like.

It is still a further object of this invention to form pass separators with a projection and closure bars having a complementary projection together therewith defining a continuous solid area ready for welding of headers directly thereto.

A still further object of this invention is to provide projections extending beyond the face of the core of a heat exchanger for obtaining the following advantages some of which, but not limited thereto, are: (1) eliminate the need for special core bands; (2) permit welding to take place away from the surface of the core; (3) eliminate leaks and fin burning around the weld areas which are occasioned by the process of welding; (4) reduce welding time; and (5) provide means which are accessible for the welding operation rendering it possible to produce uniform, strong and sound weld joints.

Other features and advantages will be apparent from the specification and claims and from the accompanying drawings which illustrate an embodiment of the invention.

FIG. 1 is a perspective view showing the configuration of a heat exchanger.

FIG. 2 is a perspective view partly in section showing a portion of the heat exchanger core illustrating one embodiment of this invention, FIG. 3 is a perspective view of the pass separator utilized in the structure shown in FIG. 2, FIG. 4 is another perspective showing another embodiment of a pass separator, FIG. 5 is a perspective showing another embodiment of a pass separator, FIG. 6 is an end view of the pass separator shown in FIG. 5 illustrating the interlocking arrangement with the adjacent pass separator, and FIG. 7 is an exploded view of and a partial showing of two layers of the core illustrating another embodiment of this invention.

Referring particularly now to FIG. 1 which shows a heat exchanger generally indicated by numeral 10 comprising a pair of external headers 12 and 14 for passing flow into and out of the core generally indicated by the numeral 16. As viewed from the drawing, one fluid is admitted through pipe 18 to header 16 for distributing the flow through the fins extending horizontally in the core 16 and being discharged into external header 14 which is in communication with the discharge pipe 20. The other fluid exchanging heat in a counter cross-flow fashion, is admitted to external header 22 through pipe 24 where it is directed to the fins generally indicated by numeral 26. External header 28 serves to direct the flow to the adjacent pass formed by the adjacent set of fins discharging to external header 30. External header 30 turns the fluid directing the flow to the adjacent pass formed by the adjacent set of fins which flow is then redirected by virtue of external header 32 to the last pass formed by the adjacent set of fins and then to the external header 34 which directs the fluid to the discharge pipe 36. It is apparent from the foregoing that this embodiment represents a four pass heat exchanger and as one skilled in this art will realize, this invention described below can be practiced with other types of plate-fin heat exchangers.

Pass separators 38 and 40 are inserted into the core between the adjacent fin passes as shown and carries projections 42 and 44 respectively projecting beyond the face or side of the core. As noted from this figure the headers abut against the side surfaces of the pass separators and are secured thereto by suitable means such as welding.

As can be seen from FIG. 2 a section of the fins is cut away a sufficient distance to accommodate the rear tapered portion of pass separator 38. Forward section 42 of pass separator 38 projecting beyond the face of the core carries a downward extending portion 46 which overlies parting sheets 48 and 50 as well as closure bar 52. As is apparent from FIG. 2 an identically shaped pass separator indicated by 38' is mounted in the same fashion and located in alignment and contact with pass separator 38. Each alternate layer of the heat exchanger contains and supports a similar pass separator and that the combined complementary pass separators serve to form a continuous rigid support member projecting beyond the face of the core for supporting the headers as shown schematically in FIG. 1 and in phantom in FIG. 2.

While the pass separator is shown as having a tapered rearwardly extending portion, it is to be understood that the invention is not particularly limited thereto, and the rear portion can take any form.

Next, referring to FIG. 3 the pass separator comprises the main body portion 38 which tapers inwardly toward the end and carries a rectangularly shaped forward projection 42 and a downward extending projection 46. A ridge or recess 54 may be formed on both sides of the main body portion 38 and extend rearwardly the length thereof for reducing the weight of the pass separator.

FIG. 4 is another version of the pass separator containing vertically extending right angle grooves 58 and 60 formed on the face of the projecting end which serves to accommodate the edge of the headers once assembled to the core.

FIG. 5 and FIG. 6 is still another version of the pass separator showing means for interlocking each adjacent pass separator which means comprises a slot 62 mounted on the top face of 42′ and tab 64 extending downwardly from the bottom of projection 46′. As can be seen in FIG. 6, tab 64 mates with groove 62 of the adjacent separator for adding rigidity to the header supporting structure.

In the view shown in FIG. 7 it is demonstrated how the pass separators generally indicated by numeral 66 may be made without containing the downward projecting portion 46 as shown in FIG. 3. In this arrangement the adjacent closure bars would carry upward projecting tabs 68 complementary to the projection 70 of pass separator 66. In this arrangement the parting sheet 72 would also be cut to have a complementary upstanding portion 74 which nestles between projection 70 and tab 68. In this manner the pass separator would be simplified by virtue of making closure bar 76 to carry the header support projections which may be formed integrally therewith or may be suitably mounted thereon.

It will be appreciated that when the core is fabricated each layer is stacked one on top of the other as demonstrated in the embodiment and that pass separators would be inserted in their proper slots. Thereafter the whole unit would be brazed by any suitable means such as by dip braze or vacuum braze.

It should be understood that the invention is not limited to the particular embodiments shown and described herein, but that various changes and modifications may be made without departing from the spirit or scope of this novel concept as defined by the following claims.

I claim:

1. In a multi-pass, multi-channel heat exchanger comprising a core having a planar side, said core including a plurality of stacked layers, each layer having a continuous fin element, spaced plates sandwiching the sides of said fin element defining therewith a series of separate parallel open ended channels, said fin elements in alternate layers terminating at said planar side, closure bars in alternate layers having an elongated portion terminating at said side, means for supporting headers adjacent said side comprising a plurality of main bodies each of which include a rearwardly extending portion adapted to fit into a groove cut into a section of said fin elements of alternate layers and abut said spaced plates, a forward projecting portion adjacent said rearwardly extending portion projecting beyond the side of said core, whereby said forward projecting portion of each main body defines a rib extending the depth of said core.

2. In a multi-pass, multi-channel heat exchanger as claimed in claim 1 wherein said rearward extending portion of said main body tapers inwardly toward the most rearward end.

3. In a multi-pass, multi-channel heat exchanger as claimed in claim 1 wherein the forward projection portion of each main body includes a downwardly extending tab on the top face and groove in the top face thereof defining interlocking means.

4. Combined pass separator and header support means for a plate-fin type of heat exchanger having a core which core has a plurality of layers each of which includes a continuous fin element, spaced plates sandwiching the sides of said fin element defining therewith a plurality of open ended channels, alternate layers including adjacent sets of channels defining at least two passes in side-by-side and coplanar relationship, said pass separator means and header support means having a main body, said main body having a rearwardly extending portion extending into a groove cut into said fin element and lying in line with said channels, a forward extending portion projecting from said rearwardly extending portion and extending beyond the face of said core, said main body portion located at a point where the two passes abut each other.

5. Combined pass separator and header support means for a plate-fin type of heat exchanger having a core which core has a plurality of layers each of which includes a continuous fin element, spaced plates sandwiching the sides of said fin element defining therewith a plurality of open ended channels, closure members in alternate layers adjacent the edge of said fin element and abutting the end of said spaced plates, alternate layers including adjacent sets of channels defining at least two passes lying adjacent to and coplanar with each other, said pass separator means and header support means having a main body, said main body having a rearwardly extending portion extending into a groove cut into said fin element and lying in line with said channels, a forward extending portion projecting from said rearwardly extending portion and extending beyond the face of said core, and a downwardly extending portion below said forward extending portion extending across said spaced plates and closure member, said main body portion located at a point where the two passes abut each other.

6. Combined pass separator and header support means for a plate-fin type of heat exchanger having a core which core has a plurality of layers each of which includes a continuous fin element, spaced plates sandwiching the sides of said fin element defining therewith a plurality of open ended channels, closure members in alternate layers adjacent the edge of said fin element and abutting the end of said spaced plates, alternate layers including adjacent sets of channels defining at least two passes lying adjacent to and coplanar relationship, said pass separator means and header support means having a main body, said main body having a rearwardly extending portion extending into a groove cut into said fin element and lying in line with said channels, a forward extending portion projecting from said rearwardly extending portion and extending beyond the face of said core, a projection on said closure member complementing said forward extending portion defining therewith a continuous rib extending the depth of said core, said main body portion located at a point where the two passes abut each other.

7. In a multi-pass, multi-channel heat exchanger comprising a core having a planar side, said core including a plurality of stacked layers, each layer having a continuous fin element, spaced plates sandwiching the sides of said fin element defining therewith a series of separate parallel open ended channels, said fin elements in alternate layers terminating at said planar side, closure bars in alternate layers having an elongated portion terminating at said side, means for supporting headers to said side comprising pass separators having a rearwardly extending portion adapted to fit into a groove cut into a section of said fin elements and abut said spaced plates, a forward projecting portion projecting beyond the side of said core and a downwardly extending portion extending across the closure bar in the adjacent layer whereby said pass separators are mounted in alternate layers and in alignment with adjacent pass separators forming therewith a solid continuous ridge extending the depth of said core.

8. In a multi-pass, multi-channel heat exchanger as claimed in claim 7 wherein said downward extending portion and said forward projecting portion terminate in a common plane defining a flat rectangularly shaped surface, recesses formed on the opposite sides of said surface adapted to receive the edge of a header, said recesses extending the depth of the core.

References Cited by the Examiner

UNITED STATES PATENTS

| | | | |
|---|---|---|---|
| 2,959,400 | 11/1960 | Simpelaar | 165—166 |
| 2,961,222 | 11/1960 | Butt | 165—166 |

FOREIGN PATENTS

| | | |
|---|---|---|
| 9,312 | 1890 | Great Britain. |

ROBERT A. O'LEARY, *Primary Examiner.*

THEOPHIL W. STREULE, *Assistant Examiner.*